United States Patent [19]

Tomka

[11] Patent Number: 5,314,934
[45] Date of Patent: May 24, 1994

[54] POLYMER MIXTURE FOR PRODUCING FILMS

[76] Inventor: Ivan Tomka, Chalet Breitfeld, 1722 Bourguillon, Switzerland

[21] Appl. No.: 975,923
[22] PCT Filed: May 12, 1992
[86] PCT No.: PCT/CH92/00091
§ 371 Date: Feb. 18, 1993
§ 102(e) Date: Feb. 18, 1993
[87] PCT Pub. No.: WO92/20740
PCT Pub. Date: Nov. 26, 1992

[30] Foreign Application Priority Data

May 18, 1991 [DE] Fed. Rep. of Germany ....... 4116404

[51] Int. Cl.$^5$ .................................................. C08L 3/06
[52] U.S. Cl. .......................................... 524/53; 524/51
[58] Field of Search ............................. 524/51, 52, 53

[56] References Cited

U.S. PATENT DOCUMENTS

| | | | |
|---|---|---|---|
| 2,676,929 | 4/1954 | Duddy | 524/52 |
| 4,133,784 | 1/1979 | Otey et al. | 524/52 |
| 5,026,745 | 1/1991 | Weil | 524/47 |
| 5,087,650 | 2/1992 | Willett | 524/52 |
| 5,162,392 | 10/1992 | Wool et al. | 524/52 |

FOREIGN PATENT DOCUMENTS

| | | |
|---|---|---|
| 0417828 | 3/1991 | European Pat. Off. |
| 0157643 | 12/1980 | Japan ........................ 524/52 |
| 9010671 | 9/1990 | World Int. Prop. O. |
| 9011326 | 10/1990 | World Int. Prop. O. |
| 9102025 | 2/1991 | World Int. Prop. O. |

*Primary Examiner*—Paul R. Michl
*Assistant Examiner*—Peter Szekely
*Attorney, Agent, or Firm*—Ostrolenk, Faber, Gerb & Soffen

[57] ABSTRACT

In order to produce a polymer mixture essentially consisting of starch and a polyolefin up to 70 wt. % of thermoplastically processable starch is mixed with 10 to 40 wt. % polyolefin and 10 to 35 wt. % ethylene/acrylate/maleic anhydride terpolymer. During this mixing process an esterification reaction takes place between the maleic anhydride groups in the terpolymer with free hydroxyl groups in the starch according to the general reaction process (I).

17 Claims, 5 Drawing Sheets

POLYMER MIXTURE FOR PRODUCING FILMS

The present invention relates to a polymer mixture essentially consisting of starch and a polyolefin, a process to produce a polymer mixture, a film of at least a single ply, consisting essentially of a polymer mixture, along with the use of the process for the purpose of producing single or multi-ply films, as well as the use of the process to produce a foam-type film.

Polymer mixtures comprising starch are known, where starch or other biopolymers are being used, preferably because of their biodegradability, their suitable price and their independence from petroleum products.

The use of biopolymers as technical material has been described in several patents. In EP-011 82 40, EP-28 24 51, EP-29 89 20, EP-30 44 01, EP-32 65 14, GB-22 14 919 and in EP-32 75 05, it is described how natural starch, gelatine or other biopolymers are modified or destructured respectively so that they can be used as technical polymers. This is accomplished by way of extrusion or by kneading of the starch or the biopolymer while utilizing the moisture content normally present in the biopolymer or in the starch, or by adding more water, in which case, however, just this relatively high water content for instance in the process of extrusion of the thus destructured biopolymers is extremely undesired. In contrast thereto, PCT-WO90-05 161 proposes to take the water out of natural starch and by means of additives or plasticizing agents such as glycerine to convert it into a technically useful polymer, that is, a so-called thermoplastically processable starch. The workability as well as the moisture resistance of this starch polymer are of course considerably better than of those starch polymers that are produced in accordance with the above-mentioned processes. However, the mechanical properties and in particular the moisture resistance are still unsatisfactory for many technical uses and in particular for the production of films.

For this reason, numerous patents, such as EP-040 28 26, EP-04047 23, EP-40 47 27, EP-40 27 28 and EP-40 73 50 propose to mix the starch with thermoplastic material such as polyolefins, polyalcohols, ABS copolymers, ethylene acrylic acid copolymers, copolymers of vinylpyrrolidines, copolymers having amino groups etc. respectively, to produce so-called polymer blends. This creates, however, the problem of a poor compatibility between the starch and the further polymers, and results in a poor phase mixing of the individual polymers.

This can for instance be seen in films produced from these materials, where the non-starch proportion of polymer present in this mixture, when used by itself to produce a film, i.e. having a corresponding thinner sheet-thickness, exhibits better tensile strength than the thicker film produced from the total polymer mixture.

According to Patents EP-40 05 31 and EP-40 05 32 it is proposed to treat the starch analogous to WO90-05 161 by means of a high boiling plasticizing agent, such as glycerine, urea, or sorbitol, in order to obtain thermoplastically processable starch in order to subsequently mix it with ethylene acrylic acid and/or polyvinyl alcohol copolymers. Films produced from these starch-polymer mixtures do exhibit a greater tensile strength; however, they are still not sufficiently moisture-resistant.

The same applies to the starch-polymer mixtures prepared in accordance with WO90-14 388, where polyethylene and ethylene acrylic acid copolymers are added to the glycerine starch.

It is, therefore, the purpose of this invention to propose a polymer mixture essentially consisting of starch, which is particularly well-suited to the production of films and which in moulds and extrudates, as for instance in films, exhibits good mechanical properties, as well as moisture-resistance.

Proposed is a polymer mixture essentially consisting of starch and polyolefin, obtained by mixing essentially moisture-free thermoplastically processable starch with at least one polyolefin and at least one ethylene acrylate maleic acid anhydride terpolymer and/or one vinyl compound carrying anhydride-function as substituents. For the definition and for the production of thermoplastically processable starch, special reference is made to WO-05 161, the content of which constitutes herewith part of the present invention. As described in said publication, in the manufacture of thermoplastically processable starch, an additive is essentially mixed with native or natural starch and the mixture is caused to melt by the application of heat and mechanical energy. The additive is a substance which lowers the melting point of the starch so that the melting point of the starch together with this additive lies below the decomposition temperature of the starch while, in addition, the additive has a solubility parameter of over 15 $cal^{\frac{1}{2}}cm^{-3/2}$. Once the starch-additive mixture has melted, the molten substance is mixed until it is at least virtually homogenous. In the melting range of the starch-additive mixture, the vapor pressure of the additive should be lower than 1 bar. Some examples of this are set forth below.

The effect of the terpolymer or the vinyl compound respectively is to be seen in the fact that it acts as a phasing agent between the starch phase and the polyolefin phase. The terpolymer comprises hydrophobic particles, as well as hydrophillic particles and permeates, therefore, the boundaries between the starch and the polyolefin.

The polymer mixture proposed in accordance with the present invention is obtained by mixing essentially up to 70% by weight thermoplastically processable starch containing at least one plasticizing agent with 10% by weight to 90% by weight of polyolefin and 1% by weight to 35% by weight of ethylene acrylate maleic acid anhydride terpolymer.

In order to obtain on the one hand good mechanical properties, such as stability of moulds and extrudates such as films, and high moisture-resistance, it is, in accordance with the invention, proposed to mix 45% by weight to 70% by weight, preferably 50% by weight to 65% by weight, of thermoplastically processable starch containing at least one plasticizing agent selected from the list of glycerine, urea, an amino-alcohol, sorbitol and/or succinic acid anhydride and 10% by weight to 40% by weight, preferably 20% by weight to 35% by weight, of polyethylene or polypropylene with 10% by weight to 35% by weight, preferably 15% by weight to 25% by weight, of ethylene acrylate maleic acid anhydride terpolymer. Moisture resistance, as well as high stability are influenced by the proportion of polyolefin and the terpolymers, whereby on the other hand too high a proportion of these two components in the mixture is, in particular for cost reasons, not desirable.

In the case of films, too high a proportion of these components results furthermore in an increased gas permeability, whereas in the case of too high a proportion of starch, for instance, the oxygen permeability is decreased.

For the production of the aforementioned polymer mixtures in accordance with the invention, it is proposed that natural starch and/or a derivative thereof, is mixed with 15% by weight to 40% by weight of at least one plasticizing agent such as glycerine, urea, an amino alcohol, sorbitol and/or succinic acid anhydride, essentially free of moisture, for the purpose of producing thermoplastically processable starch, whereupon the starch thus produced is mixed in the melt at a temperature range of 165° C. to 210° C. with a polyolefin, as for instance preferably polyethylene and/or polypropylene, and an ethylene acrylate maleic acid anhydride terpolymer and a vinyl compound respectively, carrying anhydride function as a substituent.

In this mixing process, maleic acid anhydride groups and generally all anhydride function in the terpolymer is esterified in a manner similar to the following general progress of reaction:

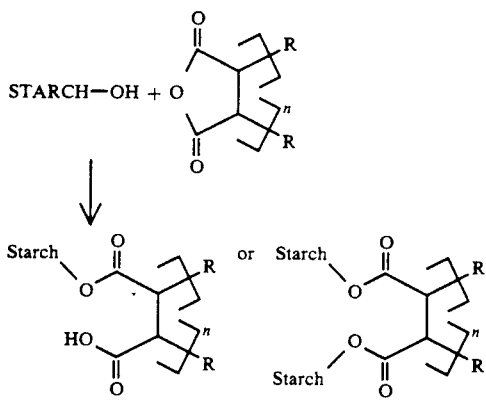

In the above, R can be for instance methyl and n can be one. The polyolefin, as for instance the polyethylene or the polypropylene, forms a sort of a matrix in which the starch will be enclosed. As mentioned before, the terpolymer and the vinyl compound respectively, serve to achieve a strong bond between the polyethylene and polypropylene respectively, and the starch and the two phases respectively, so that in the case of moulds and films accordingly produced from this polymer mixture good mechanical properties such as stability, are obtained.

This bonding at the phase boundary is achieved, as mentioned before, by means of the terpolymer for which, as already mentioned, in particular the esterification reaction is responsible. It can be proven by means of the infrared spectrum that the said reaction between the starch and the terpolymer occurs during the mixing process. This detection by means of the infrared spectrum will be discussed later.

Preferred variations of execution of the process in accordance with the invention, as in particular also the production of thermoplastically processable starch and of the ethylene acrylate maleic acid anhydride terpolymer are characterized as described below.

Here again it has to be pointed out, that in particular with regard to the production of thermoplastically processable starch reference is made to W090-05 161, the text of which constitutes part of the present invention.

The polymer mixtures produced in accordance with the present invention are especially well suited to the production of single or multi-ply films. The production of the polymer mixture can immediately be followed by the production of the film, in that the molten polymer mixture is extruded by means of a wide-mouth jet or a blow head. It is, however, also possible to first granulate the polymer mixture and to use the granulate later to produce a film.

It is in particular also possible to co-extrude the polymer mixture prepared in accordance with the present invention together with other polymers in order to produce multi-ply films, whereby for instance a three-ply film can be produced, where each outer ply contains the polymer mixture of the present invention, while the middle ply is produced from essentially thermoplastically processable starch.

It is also possible, prior to the extrusion of the polymer mixture produced in accordance with the invention, to mix in a propellant, for instance sodium carbonate or an organic acid, in which case the organic acid could for instance be citric acid.

It is, of course, also possible to produce moulds from the polymer mixture proposed by the invention, or extrudates such as hoses, where the composition of the polymer mixture, within the limits suggested by the invention, is dictated by the demands of the article to be produced.

The invention will now be explained by means of examples and by reference to the attached diagrams as follows.

Figure 1:
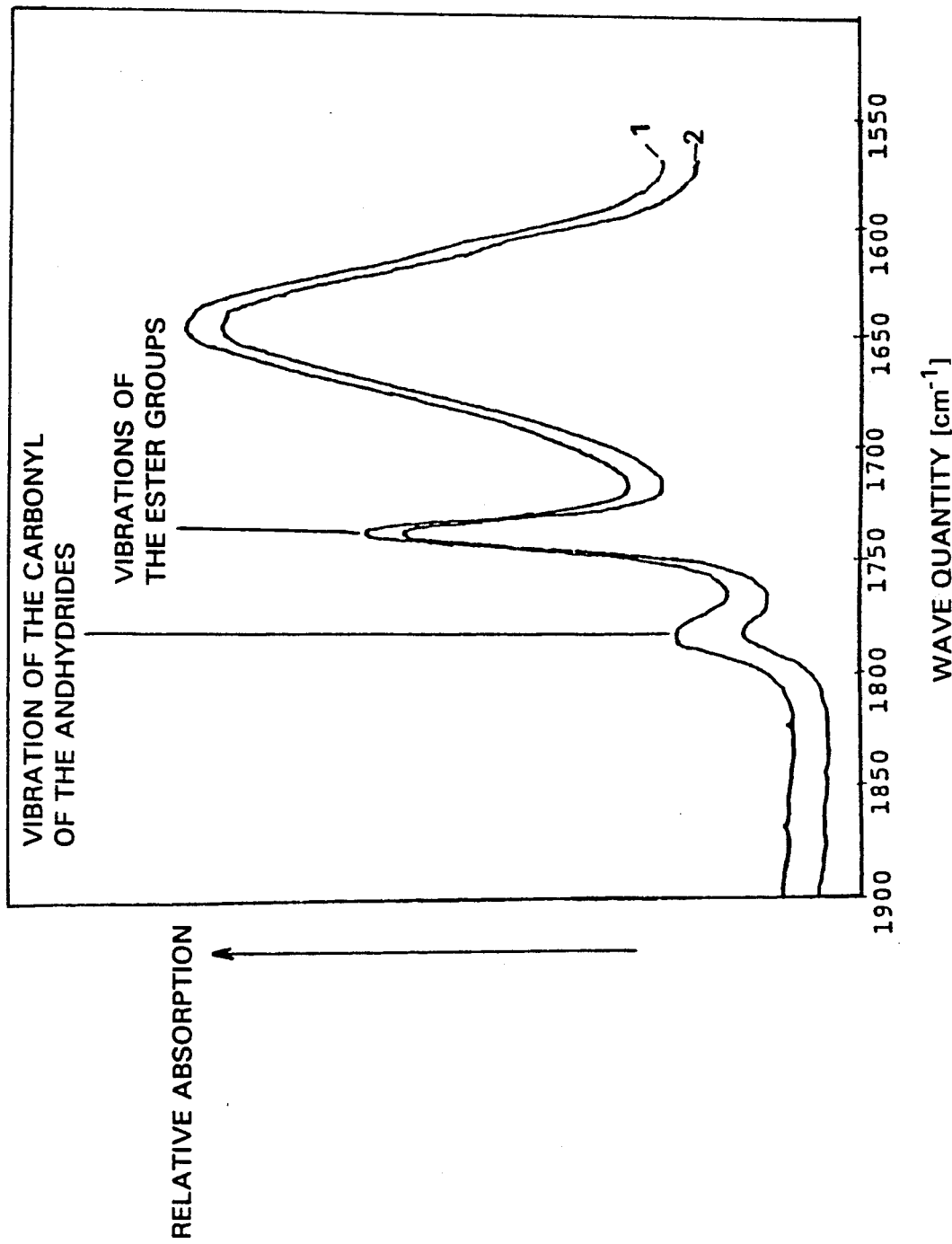
FIG. 1 shows infrared spectra of the polymer mixture at the beginning and at the end of the mixing process.

1. Production of the Thermoplastically Processable Starch

One starts with dried natural starch having a moisture content of preferably less than 1% by weight. The natural starch is hydrolysed by means of a suitable plasticizer, as for instance glycerine, whereby, in relation to the total mixture, preferably between 25% by weight and 35% by weight of glycerine is added. The starch/glycerine mixture is subsequently well mixed in an extruder at a temperature between 160° C. and 190° C., preferably with high shearing action, or this mixing could also be done in a kneader.

Suitable plasticizers are, of course, also other materials, such as urea, sorbitol, succinic acid anhydride, amino alcohols etc., and at this point attention should be drawn again to W090-05 161, where a series of further suitable plasticizers and additives are defined.

The subsequent treatment of the thermoplastically processable starch thus produced can be carried out directly in the same extruder or the starch can first be granulated.

2. Ethylene Acrylate Maleic Acid Anhydride Terpolymer

It is not intended to elaborate at this point on the production of these terpolymer since they are basic products and do not constitute a feature of the present invention.

The terpolymer suitable for the present invention are terpolymer preferably composed as follows:

| Parts by Weight | |
|---|---|
| Ethylene: | 80-95% by weight |
| Acrylic acid methyl ester: } → | 5-15% by weight |
| Acrylic acid ethyl ester: } | |
| Maleic acid anhydride: | 0.2-1% by weight |

In the following example of a polymer mixture produced in accordance with the present invention, a terpolymer having the following parts by weight has been used:

| | |
|---|---|
| Ethylene: | 88.0% by weight |
| Acrylic acid methyl ester: | 9.0% by weight |
| Acrylic acid ethyl ester: | 2.5% by weight |
| Maleic acid anhydride: | 0.5% by weight |

3. Production of a Starch Ethylene Terpolymer Mixture

Following the production of the thermoplastically processable starch in accordance with point 1), a homogeneous mixture consisting of polyethylene and the terpolymer in accordance with point 2) was added to the starch melt at the beginning of the second mixing phase in the same extruder at a temperature of 170° C. as set at the extruder. The temperature of the melt was at this point about 190° C. to 200° C. The starch, polyethylene, terpolymer mixture was thereafter, during that second mixing step, mixed under strong shearing action created by means of kneading blocks and backwash elements. Preferably a co-kneader or a twin-shaft extruder is used. The total mechanical energy created amounted to approximately 0.4 kwh/kg.

The quantities of the polyethylenes and terpolymers that have been added are listed in the following Table, where in the abbreviation TPS = thermoplastically processable starch, P = proportion of terpolymer, and K = proportion of polyethylene are used.

The polyethylene used was a high density polyethylene produced by BASF. Likewise listed in the Table is the proportion of plasticizer, or glycerine present in the thermoplastically processable starch that was used.

The polymer mixtures that were produced in accordance with the present invention and listed in the following Table were used to produce films which were tested for their tensile strength and elongation properties. The measurements obtained are also shown in the Table below.

| Starch Polyethylene Terpolymer Mixtures Produced in Accordance with the Invention | | | | | |
|---|---|---|---|---|---|
| Moisture Content | Plasticizer (% by weight) | TPS/P/K | Tensile Strength (MPa) | Strength at strain limit | Stretch % |
| 2.8 | 18.6 | 50:20:30 | 18.2 | — | 95.0 |
| 0.5 | 25.7 | 50:10:40 | 15.9 | — | 43.0 |
| 0.5 | 25.7 | 50:25:25 | 12.2 | — | 168.0 |
| 0.5 | 25.7 | 65:21:14 | 12.0 | — | 75.0 |
| 0.5 | 25.7 | 50:15:35 | 16.6 | — | 59.0 |
| 0.5 | 25.7 | 55:32:13 | 16.2 | — | 53.0 |
| 0.8 | 19.1 | 55:13:32 | 17.5 | — | 30.0 |
| 0.8 | 17.3 | 50:15:35 | 16.7 | — | 26.5 |
| 0.8 | 17.3 | 60:12:28 | 15.7 | — | 14.0 |
| 0.5 | 12.0 | 50:15:35 | 20.5 | 21.0 (longitudinally) | 290 |
| 0.5 | 12.0 | 50:15:35 | 20.5 | 21.0 (diagonally) | 290 |

With regard to tensile strength, it can be seen that the ratio between the individual components is of very little impact. On the other hand, it can be seen, however, that the proportions of polyethylene and copolymers have a great effect on the stretchability, and that a relatively small proportion of polyethylene or a small proportion of terpolymer result in a relatively poor stretchability.

4. Esterification Reaction

During the process of mixing the thermoplastically processable starch, the polyethylene and the ethylene acrylate maleic acid anhydride in the extruder, an esterification reaction occurs between the maleic acid anhydride groups in the terpolymer and the hydroxyl groups of the starch. Such an esterification reaction is, by the way, also possible between maleic acid anhydride groups and the glycerine that has been added to the starch as a plasticizer; this reaction is, however, relatively insignificant.

To confirm this reaction, samples of the polymer mixture were taken from the extruder at the beginning and at the end of the mixing step, and corresponding infrared spectra were established as shown in FIG. 1. It can be seen in FIG. 1 that infrared active molecular vibrations of anhydride groups occur at 1780 cm$^{-1}$. By comparison, infrared active molecular vibrations of the estergroups are detectable at 1740 cm$^{-1}$.

Graph 1 shows the infrared spectrum at the beginning of the mixing process, and Graph 2 shows the infrared spectrum at the end of the mixing process.

It has furthermore been found by means of infrared spectra of samples taken during the mixing process that the intensity of the "peaks" of the anhydride group decreases as the mixing process continues, whereas the intensity of the ester vibrations increases.

Figure 2:
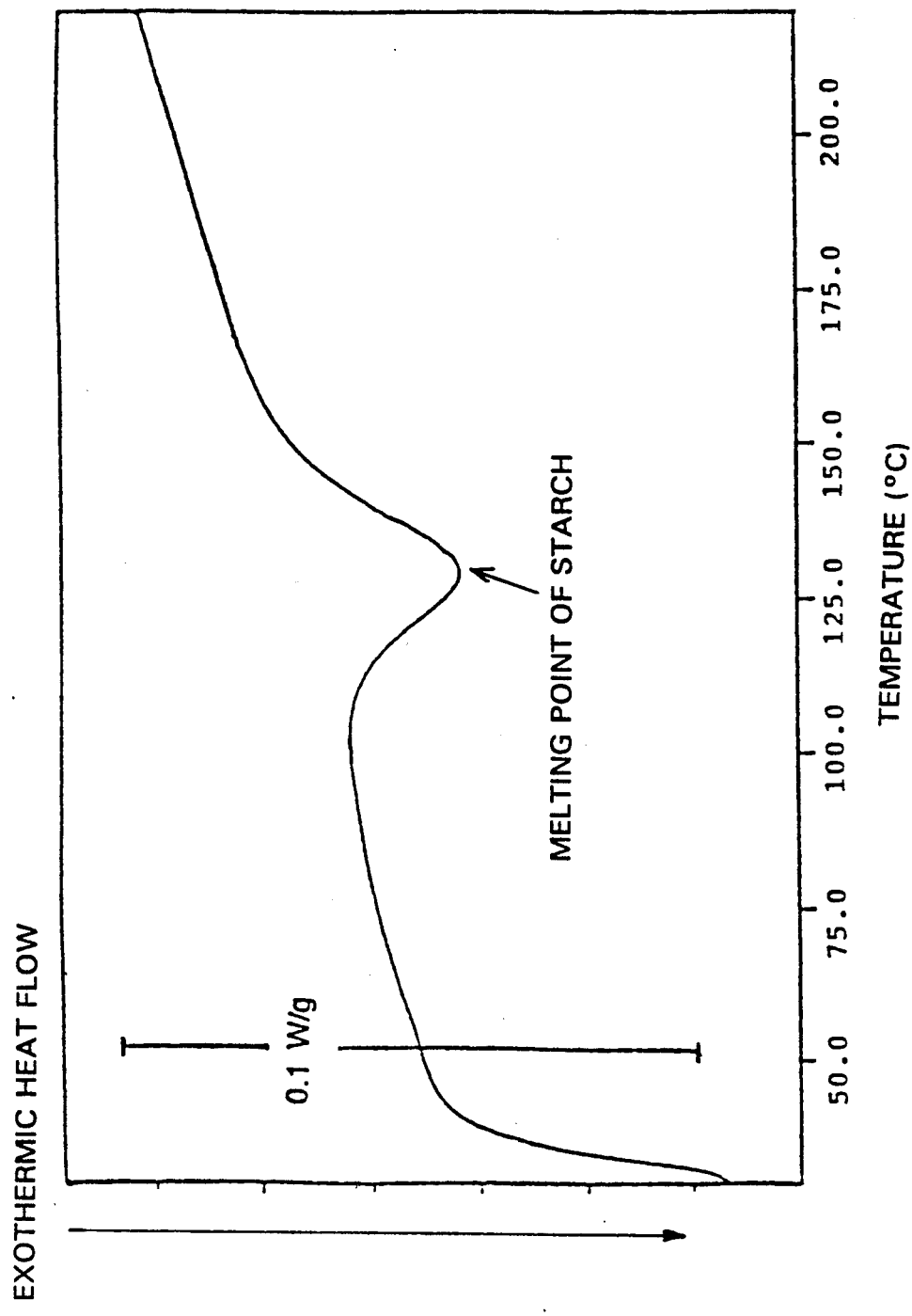
FIG. 2 shows the heat flow diagram of natural starch with glycerin.
Figure 3:
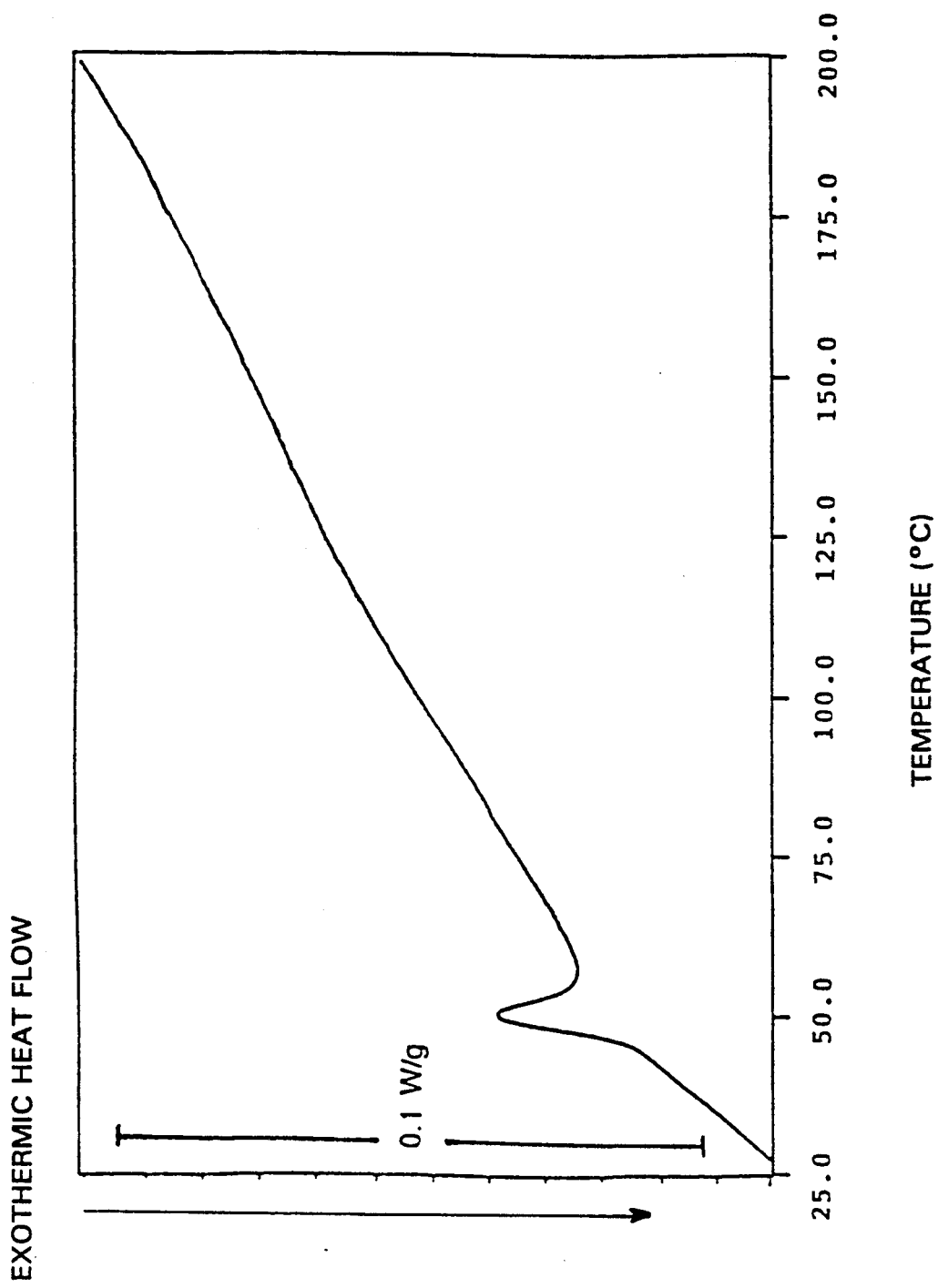
FIG. 3 shows the heat flow diagram of thermoplastically processable starch.

FIGS. 2 and 3 show heat flow diagrams of natural starch and glycerine respectively of thermoplastically processable starch.

Figure 4:
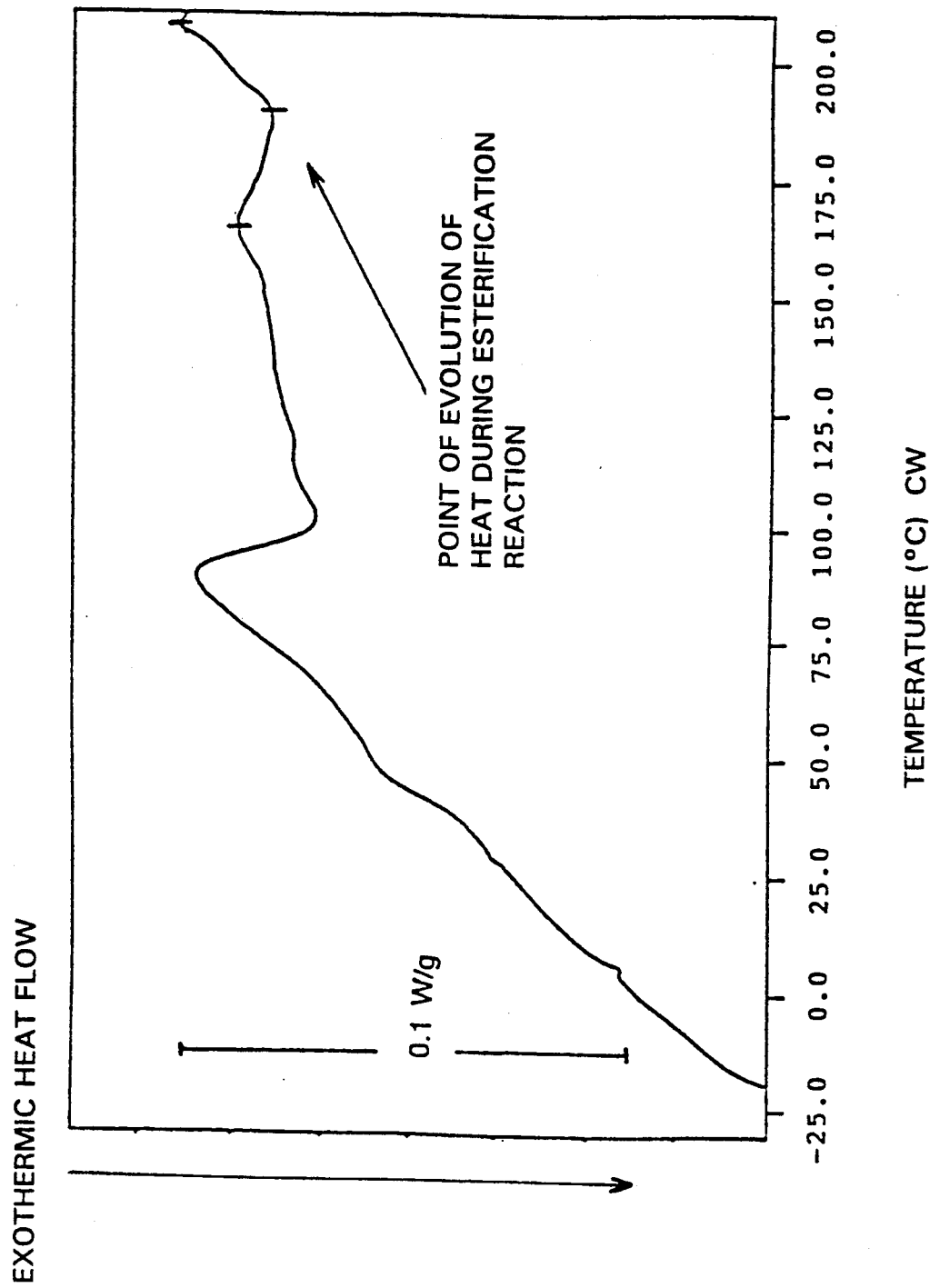
FIG. 4 shows the heat flow diagram when thermoplastically processable starch mixed with an ethylene acrylate maleic acid anhydride terpolymer.
Figure 5:
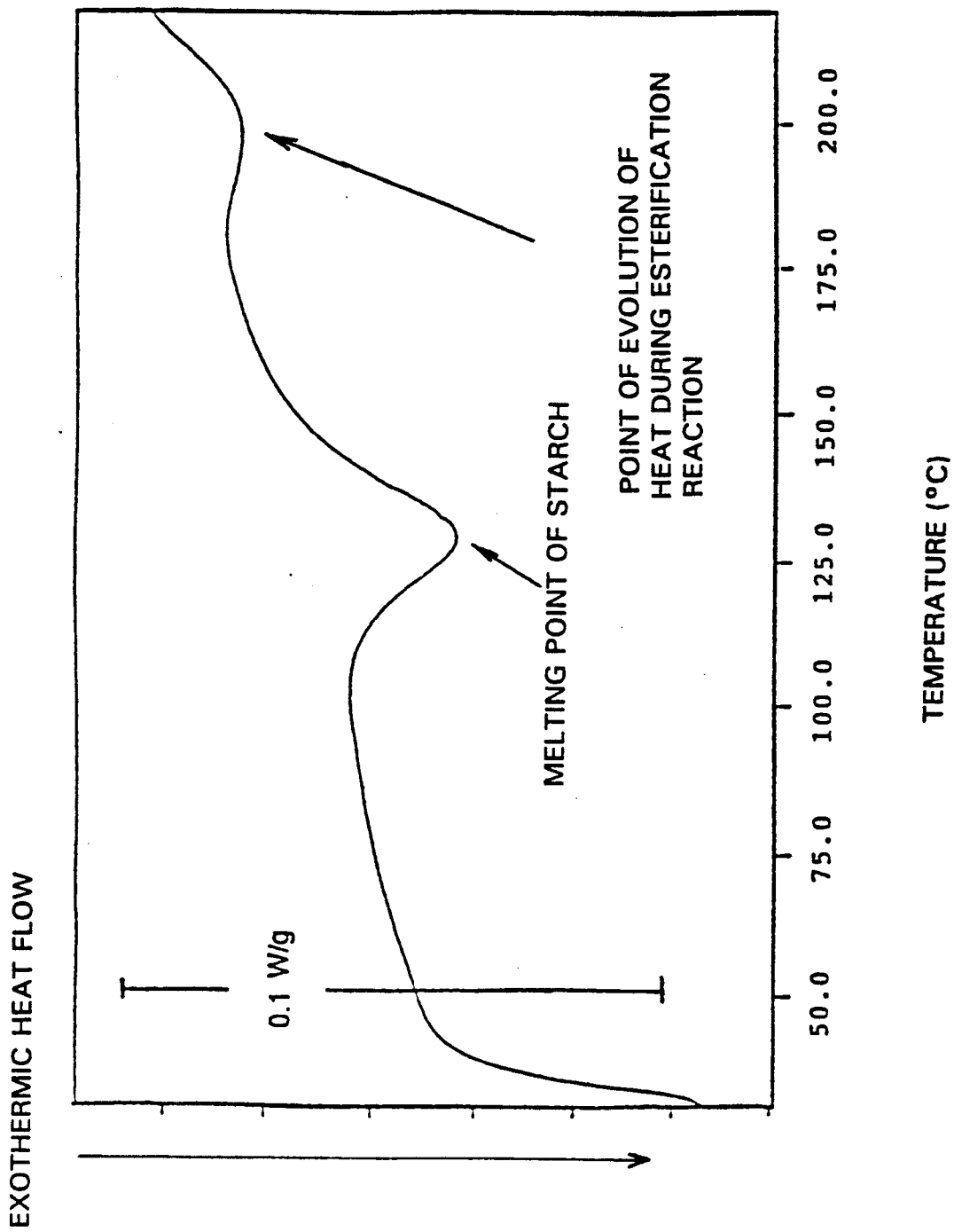
FIG. 5 shows the heat flow diagram when natural starch and glycerine are mixed with an ethylene acrylate maleic acid anhydride terpolymer.

In FIGS. 4 and 5, the esterification reaction has been monitored by means of a thermal flux calorimeter having a heat rate of 10°/min. It shows the progress of an exothermic reaction at a temperature range from 165° C. to 207° C., where a maximum peak is visible at 190° C. FIG. 4 is based on a thermoplastically processable starch to which an ethylene acrylate maleic acid anhydride terpolymer has been added, and FIG. 5 is based on natural starch and glycerine.

The polymer mixtures defined above in accordance with the present invention and consisting of thermoplastically processable starch and a polyolefin, as for instance the polyethylene mentioned, and of the ethylene acrylate maleic acid anhydride terpolymer, are suitable for the production of any kind of moulded body or extrudate. Particularly suitable for the production of films are polymer mixtures as defined in accordance with the invention, where these could be a single ply film as well as a multi-ply film, whereby, for their production, the polymer mixture as defined in the invention can be co-extruded together with thermoplastically processable starch.

It must furthermore be mentioned that instead of the ethylene acrylate maleic acid anhydride-terpolymer, any vinyl combinations carrying anhydride functions as substituents can be used as well.

I claim:

1. A polymer mixture consisting essentially of thermoplastically processable starch, at least one polyolefin, at least one vinyl compound carrying an anhydride substituent and an esterification product of the starch and the anhydride containing vinyl compound.

2. The polymer mixture in accordance with claim 1, characterized in that said vinyl compound is a terpolymer of ethylene, acrylate and maleic acid anhydride.

3. The polymer mixture in accordance with claim 2, characterized in that prior to mixing so as to form said esterification product, the polymer mixture contains up to 70% by weight of said thermoplastically processable starch, 10–90% by weight polyolefin and 1–35% by weight of said terpolymer.

4. The polymer mixture in accordance with claim 3, characterized in that said percentages are 40–70% by weight thermoplastically processable starch containing at least one plasticizing agent selected from the group consisting of glycerin, urea, and amino alcohol, sorbitol, succinic acid anhydride and mixtures thereof, 10–40% by weight of at least one member of the group consisting of polyethylene and polypropylene and 10–35% by weight of said terpolymer.

5. The polymer mixture in accordance with claim 4, characterized in that said percentages are 20–35% by weight of polyolefin and 15–25% by weight of terpolymer.

6. The polymer mixture in accordance with claim 2, characterized in that said terpolymer contains 80–95% by weight ethylene, 5–15% acrylate and 0.2–1% by weight maleic acid anhydride.

7. The polymer mixture in accordance with claim 6, characterized in that said acrylate is acrylic acid methyl ester, acrylic acid ethyl ester, or a mixture thereof.

8. A process for the production of a polymer mixture, consisting essentially of starch and a polyolefin, in accordance with claim 1, characterized in that natural starch or a derivative thereof is mixed with 15% by weight to 40% by weight of at least one essentially anhydrous plasticizing agent selected from the group consisting of glycerine, urea, an amino alcohol, sorbitol, succinic acid anhydride and mixtures thereof, for the production of thermoplastically processable starch, whereafter the same, at a temperature of between 165° C. to 210° C., is mixed in the melt with a polyolefin and an ethylene/acrylate/maleic acid anhydride terpolymer, whereby maleic acid anhydride groups in the polymer are esterified by means of free hydroxyl groups in the starch.

9. A process, in accordance with claim 8, characterized in that up to 70% by weight of thermoplastically processable starch is mixed in an extruder or kneader with 10% by weight to 40% by weight of at least one of polyethylene and polypropylene and 10% by weight to 35% by weight of an ethylene/acrylate/maleic acid anhydride terpolymer, whereby during the mixing process the total mechanical energy created amounts to approximately 0.4 kWh/kg.

10. A process, in accordance with claim 8 characterized in that natural starch or a derivative thereof having a moisture content of less than 1% is homogenized with said plasticizing agent at a temperature of 160° C. to 190° C. in an extruder or kneader, whereupon in a further extrusion or in the same extruder in a further step, mixing with at least one of polyethylene and polypropylene and said terpolymer takes place.

11. A process, in accordance with the claim 8, characterized in that the natural starch or a derivative thereof is pre-mixed with said plasticizing agent essentially at room temperature or at a raised temperature, whereupon the starch will swell, forming a dry granulate which subsequently will be used for further working and for mixing with said polyethylene or polypropylene, as well as with the terpolymer.

12. A process, in accordance with claim 8, characterized in that an ethylene/acrylate/maleic acid anhydride terpolymer is used which is obtained by working-up of 80% by weight to 95% by weight of ethylene, 1% by weight to 15% by weight of at least one of acrylic acid methyl ester and acrylic acid ethyl ester, as well as 0.1% by weight to 15% by weight of maleic acid anhydride.

13. A film, consisting of at least one single ply, consisting essentially of a polymer mixture in accordance with claim 1.

14. A process in accordance with claim 8 for the production of a single or multi-ply film comprising at least one ply consisting of a polymer mixture characterized in that the polymer mixture produced is processed into a film by means of an extrusion selected from the group consisting of wide-mouth extrusion, blow extrusion and co-extrusion.

15. A process in accordance with claim 14, characterized in that the mixture is co-extruded to produce a two-ply or multi-ply film.

16. A process in accordance with claim 8, for the production of a foam comprising a polymer mixture characterized in that prior to its extrusion a propelling agent or an organic acid, is added to the polymer mixture.

17. A moulded body or extrudate, consisting essentially of a polymer mixture in accordance with claim 1.

* * * * *